(12) United States Patent
Fukuda et al.

(10) Patent No.: US 8,712,770 B2
(45) Date of Patent: Apr. 29, 2014

(54) METHOD, PREPROCESSOR, SPEECH RECOGNITION SYSTEM, AND PROGRAM PRODUCT FOR EXTRACTING TARGET SPEECH BY REMOVING NOISE

(75) Inventors: Takashi Fukuda, Yokohama (JP); Osamu Ichikawa, Yokohama (JP); Masafumi Nishimura, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 1528 days.

(21) Appl. No.: 12/105,621

(22) Filed: Apr. 18, 2008

(65) Prior Publication Data

US 2008/0270131 A1    Oct. 30, 2008

(30) Foreign Application Priority Data

Apr. 27, 2007    (JP) .................................. 2007-119194

(51) Int. Cl.
  *G10L 15/20* (2006.01)
  *G10L 21/02* (2013.01)
(52) U.S. Cl.
  CPC ................. *G10L 15/20* (2013.01); *G10L 21/02* (2013.01)
  USPC .......................................... 704/233; 704/226
(58) Field of Classification Search
  CPC .................................. G10L 15/20; G10L 21/02
  USPC .................................................. 704/226, 233
  See application file for complete search history.

(56) References Cited

U.S. PATENT DOCUMENTS

| | | | |
|---|---|---|---|
| 6,289,309 B1 * | 9/2001 | deVries .......................... | 704/233 |
| 7,099,821 B2 * | 8/2006 | Visser et al. ................... | 704/226 |
| 7,218,741 B2 * | 5/2007 | Balan et al. .................... | 381/92 |
| 7,359,504 B1 * | 4/2008 | Reuss et al. ............... | 379/406.02 |
| 7,602,926 B2 * | 10/2009 | Roovers ........................ | 381/94.2 |
| 2003/0040908 A1 * | 2/2003 | Yang et al. ..................... | 704/233 |
| 2003/0177006 A1 * | 9/2003 | Ichikawa et al. ............... | 704/231 |
| 2004/0037436 A1 * | 2/2004 | Rui ................................. | 381/92 |
| 2005/0288923 A1 * | 12/2005 | Kok ............................... | 704/226 |
| 2007/0021958 A1 * | 1/2007 | Visser et al. ................... | 704/226 |
| 2007/0280486 A1 * | 12/2007 | Buck et al. ..................... | 381/92 |
| 2008/0071547 A1 * | 3/2008 | Prieto et al. ................... | 704/275 |

OTHER PUBLICATIONS

Denda et al. "A Study of Weighted CSP Analysis with Average Speech Spectrum for Noise Robust Talker Localization", Interspeech, Lisbon Portugal, Sep. 2005.*

(Continued)

*Primary Examiner* — Jialong He
(74) *Attorney, Agent, or Firm* — Wolf, Greenfield & Sacks, P.C.

(57) ABSTRACT

The present invention relates to a method, preprocessor, speech recognition system, and program product for extracting a target speech by removing noise. In an embodiment of the invention target speech is extracted from two input speeches, which are obtained through at least two speech input devices installed in different places in a space, applies a spectrum subtraction process by using a noise power spectrum ($U\omega$) estimated by one or both of the two speech input devices ($X\omega(T)$) and an arbitrary subtraction constant ($\alpha$) to obtain a resultant subtracted power spectrum ($Y\omega(T)$). The invention further applies a gain control based on the two speech input devices to the resultant subtracted power spectrum to obtain a gain-controlled power spectrum ($D\omega(T)$). The invention further applies a flooring process to said resultant gain-controlled power spectrum on the basis of arbitrary Flooring factor ($\beta$) to obtain a power spectrum for speech recognition ($Z\omega(T)$).

16 Claims, 6 Drawing Sheets

(56) References Cited

OTHER PUBLICATIONS

Sim et al. "A Parametric Formulation of the Generalized Spectral Subtraction Method", IEEE Transactions on Speech and Audio Processing, vol. 6, No. 4, Jul. 1998.*

Abe et. al., "A Study on Speech Detection and Speech Enhancement Based on the Cross Correlation . . . ," IEICE technical report, Speech, Jan. 2003, pp. 25-31, SP2002-165, Japan.

Denda et. al. "A Study of Hands-free Voice Activity Detection Based on . . . ," Lecture meeting of the Acoustical Society of Japan, Sep. 2006, pp. 25-26, 1-2-13, Japan.

Ariki et. al. "Hands-Free Speech . . . " The 4th DSPS Educational Conference, Graduate School of Science and Technology, Ryukoku University, Aug. 2002, pp. 55-58, Japan.

Denda et. al. "A Study of Talker Localization Based on Subband CSP Analysis," IEICE technical report, Speech, Dec. 2004, pp. 79-84, SP2004-109, Japan.

* cited by examiner

EXAMPLE OF NOISE SEGMENT (NON-SPEECH SEGMENT OF TARGET SPEAKER)
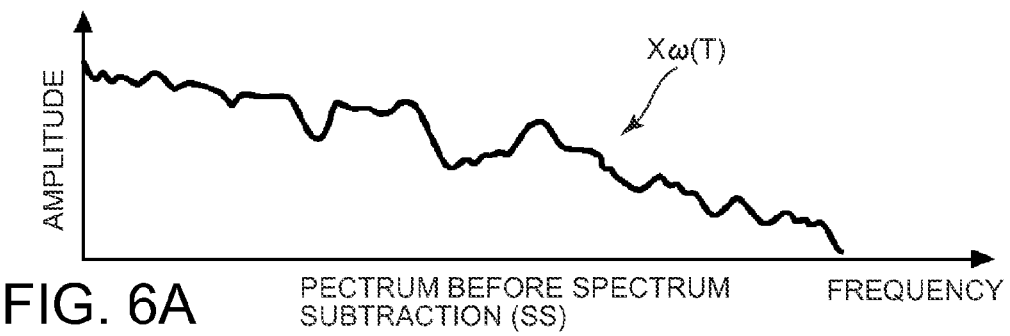
FIG. 6A — SPECTRUM BEFORE SPECTRUM SUBTRACTION (SS)
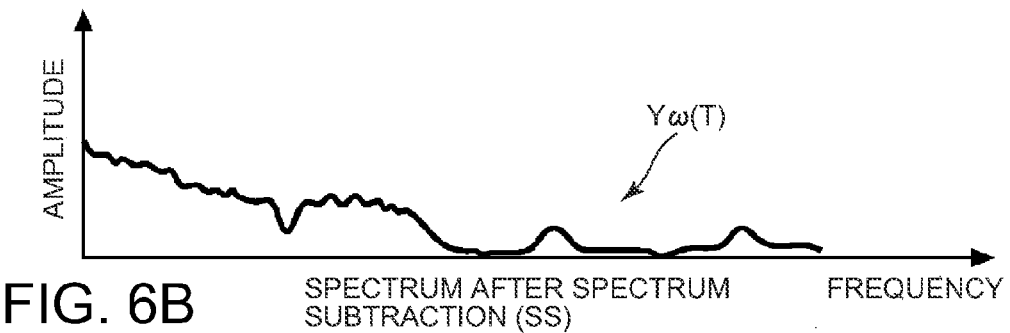
FIG. 6B — SPECTRUM AFTER SPECTRUM SUBTRACTION (SS)
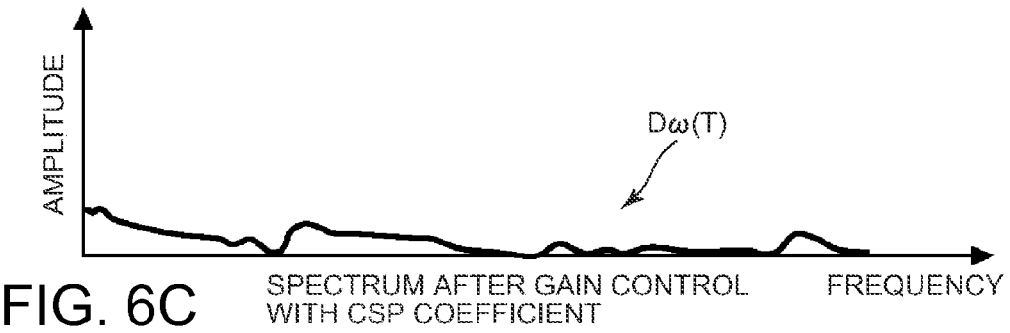
FIG. 6C — SPECTRUM AFTER GAIN CONTROL WITH CSP COEFFICIENT
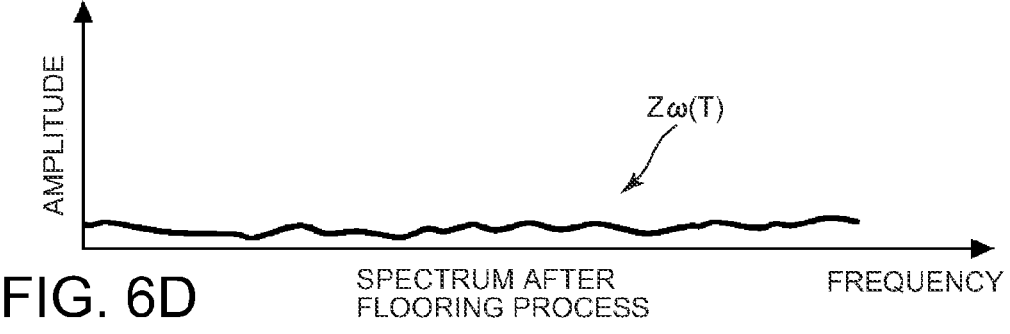
FIG. 6D — SPECTRUM AFTER FLOORING PROCESS

METHOD, PREPROCESSOR, SPEECH RECOGNITION SYSTEM, AND PROGRAM PRODUCT FOR EXTRACTING TARGET SPEECH BY REMOVING NOISE

CROSS-REFERENCE TO RELATED APPLICATIONS

This application claims priority under 35 U.S.C. §119 to Japanese Patent Application No. 2007-119194 filed Apr. 27, 2007, the entire contents of which is incorporated herein by reference.

FIELD OF THE INVENTION

The present invention relates to a method, system, and computer program product technique for speech recognition. More specifically, the present invention relates to a preprocessing technique for recognizing the speech of a target speaker, and more specifically to a technique for extracting a target speech by removing noise in a noisy environment.

BACKGROUND OF THE INVENTION

In recent years, we increasingly encounter a situation requiring speech processing for extracting a target speech in a noisy environment with the aim of improving usability. A typical example of the situation discussed above is an operation of an in-car navigation system through speech recognition. If a driver can specify an operation in a hands-free manner through a command or the like issued by driver's natural voice while sitting on a driver's seat without being aware of the existence of a microphone so much, the driver can concentrate on driving without taking his/her eyes from the scene in front of the car and therefore it can contribute to driver's safety.

From a viewpoint of voice activity detection (VAD), the usage of speech recognition can be divided into three types of systems: (1) Push-to-Talk system; (2) Push-to-Activate system; and (3) Always-Listening system. Among them, the Push-to-Activate system in (2) is widely used in consideration of a balance between performance and usability in the field of car navigation systems. In the Push-to-Activate system in (2), first, a talk switch is pressed to notify the system of the start of speech before the issue of a speech command. The end of the speech is automatically detected on the system side.

In a general car navigation system equipped with the current speech recognition, the talk switch is pressed to stop an audio stream being played so as to create a quiet indoor environment for speech recognition in order to maintain a recognition performance and a speech segment (the end of speech) detection performance. On this occasion, other seat members sitting on a passenger seat and the like have to stop their conversation temporarily and to keep quiet so as to make no noise. It is unpleasant for the driver and other seat members to stop the music or to keep waiting in silence and patience because of the speech recognition and it is therefore unfavorable from a viewpoint of usability. Accordingly, it is desired to provide a speech recognition technology equivalent to the Always-Listening system in (3) that does not require muting and is practicable without any change in the car interior acoustic environment.

In the case of attempting to use speech recognition without muting in a car, a first conceivable measure is to remove audio sound being played by means of an echo canceller. This measure, however, requires signal processing with a heavy load and further requires dedicated hardware or wires for reference input, which leads to a heavy burden on an in-car equipment manufacturer or automaker.

On the other hand, there have been suggested methods such as an independent component analysis (ICA) and an adaptive beamformer capable of preventing a malfunction caused by voice of other seat members sitting on the passenger seat and backseats in the case of attempting to cause a car navigation system to recognize a command spoken by a driver as a target speech with the driver set as a target speaker. In order to achieve practically sufficient performance, however, it is necessary to prepare a large number of calculation sources or to specify the number of noise sources in advance (the number of microphones needs to be greater than the number of noise sources).

In contrast to them, a method of applying gain control to a speech spectrum using a cross-correlation between two-channel signals such as a cross-power spectrum phase (CSP) coefficient requires only a low calculation amount and is capable of efficiently removing voice from unexpected directions and it is therefore expected as a promising method. The conventional method using the CSP technique, however, has not been successful yet in getting practically sufficient recognition performance from the recognition system in an actual environment in the car partly because a combined application with other noise removal techniques has not been sufficiently studied.

For example, the following Nonpatent Document, "A Study on Speech Detection and Speech Enhancement Based on the Cross Correlation Coefficient," does not refer to a relationship between a noise processing technique and a flooring process and Nonpatent Document 2, A Study of Hands-free Voice Activity Detection Based on Weighted CSP Analysis and Zero Crossing Detector," does not suggest gain control. Nonpatent Document 3, "Hands-Free Speech Recognition in Real Environments Using Microphone Array and Kalman Filter as a Front-End System of Conversational TV," and Nonpatent Document 4, "A Study of Talker Localization Based on Subband CSP Analysis," are cited as background art of handsfree speech recognition or the CSP method.

"A Study on Speech Detection and Speech Enhancement Based on the Cross Correlation Coefficient," Yoshifumi Nagata, Toyota Fujioka, and Masato Abe (Department of Computer and Information Science, Iwate University), IEICE technical report, Speech, SP2002-165, pp. 25-31, January 2003 discloses a new method to measure the target speech activity and its application both to target speech detection and to speech enhancement. This measure is the modified cross correlation coefficient calculated from the weighted cross spectrum assuming that the two directional microphones receive the identical target signal. The weighting function which have been delivered to obtain Maximum Likelihood estimator of the generalized cross correlation function is combined with the inter-channel power ratio to attenuate coherent signal arriving from an uninteded direction. We apply this measure not only to target speech detection but to speech enhancement by utilizing it to control the total output gain. The proposed activity measure is evaluated in the speech enhancement experiments and in the word endpoint detection of an HMM-based speech recognition system across several signal-to-noise ratios (SNR) and three noise conditions. We show that the proposed speech enhancer outperforms both the adaptive beamformer and the coherence based filtering in all the noise conditions. Moreover, we show that being compared with the conventional recognition system which employs adaptive beamforming and spectral subtraction, the system with the proposed detector improves the recognition rate by 64.6% and 60.7% in the presence of impulsive noise and speech noise respectively at SNR=0 dB.

"A Study of Hands-free Voice Activity Detection Based on Weighted CSP Analysis and Zero Crossing Detector," Takamasa Tanaka, Yuki Denda, Masato Nakayama, and Takanobu Nishiura (Ritsumeikan University), the collected papers presented at the lecture meeting of the Acoustical Society of Japan, 1-2-13, pp. 25-26, September 2006. Hands-free voice activity detection is indispensable in hands-free sound recognition in a noisy environment, but the detection function declines markedly in an extremely noisy environment since detection is done based on the time information for the power in the conventional method. In this article the authors examine hands-free voice activity detection that is robust towards noise by actively employing spatial information as well as time information.

"Hands-Free Speech Recognition in Real Environments Using Microphone Array and Kalman Filter as a Front-End System of Conversational TV," Masakiyo Fujimoto and Yasuo Ariki (Graduate School of Science and Technology, Ryukoku University), The 4th DSPS Educational Conference, pp. 55-58, August 2002. An interactive type television is desirable so that viewers can make detailed inquiries about televised content of interest to them. Such an interactive television enables users to face the television using a microphone and say "Please tell me more about XXX" while watching a news show and so on. However, since natural speech is inhibited by the speaker's being overly conscious when speaking into the mike, hands-free speech recognition is needed, but there are the problems of noise and echoes in the latter case. Research has been done about raising the quality of sound reception by forming directionality with a microphone array, and there are two main kinds, the delayed sum array system (for forming directionality for the speaker) and the adaptive array (for forming a dead zone for noise with directionality). In this study, we have assumed a situation where the noise does not impart directionality and spreads inside the laboratory, and reception of speech that is emitted with a delayed sum array is carried out. Although the emitted speech can stressed and noise can be inhibited by a delayed sum array, the noise is still superimposed in the received speech signals and this affects speech recognition precision. There is also the problem that such arrays cannot cope adequately with echoes. To solve these problems, the speech signals after beam forming with a speech recognition method that is robust against noise (see note 3 for the prior invention) are recognized. We then evaluated this method in an environment where news audio was present in a background that assumes an interactive type television.

"A Study of Talker Localization Based on Subband CSP Analysis," Yuki Denda, Takanobu Nishiura, Hideki Kawahara, and Toshio Irino (Graduate School of Systems Engineering, Wakayama University; and College of Information Science and Engineering, Ritsumeikan University), IEICE technical report. Speech, NLC 2004-69, pp. 79-84, SP2004-109, December 2004 discloses It is very important to capture distant-talking speech with high quality for hands-free speech acquisition systems. Microphone array steering is an ideal candidate for capturing distant-talking speech with high quality. However, it requires localizing a target talker before capturing distant-talking speech. Conventional talker localization methods cannot localize a target talker accurately in higher noisy environments. To deal with this problem, in this paper, we propose a new talker localization method based on subband CSP analysis with weighting of an average speech spectrum. It consists of subband analysis with equal bandwidth on mel-frequency and analysis weight coefficients based on an average speech spectrum, which are trained with a speech database, in advance. As a result of evaluation experiments in a real room, we confirmed that the proposed method could provide better talker localization performance than the conventional methods.

SUMMARY OF THE INVENTION

The illustrative embodiments of the present invention described herein provide a method, apparatus, and computer usable program product for detecting the order of wagons in a train. The embodiments described herein further provide if and how the order of wagons in a freight train is changed in a reliable manner.

An exemplary feature of an embodiment of the present invention is a method for extracting a target speech from two input speeches, which are obtained through at least two speech input devices installed in different places in a space. An embodiment of the invention consists of a method for applying a spectrum subtraction process by using a noise power spectrum ($U\omega$) estimated by one or both of the two speech input devices ($X\omega(T)$) and an arbitrary subtraction constant ($\alpha$) to obtain a resultant subtracted power spectrum ($Y\omega(T)$). The method further consists of applying a gain control based on the two speech input devices to the resultant subtracted power spectrum to obtain a gain-controlled power spectrum ($D\omega(T)$). The method further consists of applying a flooring process to said resultant gain-controlled power spectrum on the basis of arbitrary Flooring factor ($\beta$) to obtain a power spectrum for speech recognition ($Z\omega(T)$).

Another exemplary feature of an embodiment of the present invention is a speech recognition system. An embodiment of the invention consists of a preprocessor for performing preprocessing before recognition of a target speech based on two input speeches obtained from at least two speech input devices installed in different places in a space. The system further consists of a spectrum subtraction process section which is connected to the two speech input devices operable to apply a spectrum subtraction process using a noise power spectrum ($U\omega$) estimated by one or both of the two input speeches devices ($X\omega(T)$) and an arbitrary subtraction constant ($\alpha$) to obtain a subtracted power spectrum ($Y\omega(T)$). The system further consists of a gain control section which is connected to the spectrum subtraction process section operable to apply gain control based on said two input speeches to a resultant subtracted power spectrum to obtain a gain-controlled power spectrum ($D\omega(T)$). The system further consists of a flooring process section connected to the gain control section operable to apply a flooring process to the resultant gain-controlled power spectrum on a basis of a arbitrary Flooring factor ($\beta$) to obtain a power spectrum for speech recognition ($Z\omega(T)$).

Another exemplary feature of an embodiment of the present invention is a computer program product consisting of a computer useable medium including a computer readable program, wherein the computer readable program when executed on a computer causes the computer to perform the method steps for extracting a target speech from two input speeches, which are obtained through at least two speech input devices installed in different places in a space. The method consists applying a spectrum subtraction process by using a noise power spectrum ($U\omega$) estimated by one or both of said two input speeches ($X\omega(T)$) and an arbitrary subtraction constant ($\alpha$) to obtain a subtracted power spectrum ($Y\omega$ (T)). The method further consists of applying a gain control based on the two input speeches to the subtracted power spectrum to obtain a gain-controlled power spectrum ($D\omega$ (T)). The method further consists of applying a flooring process to said gain-controlled power spectrum on the basis of arbitrary flooring factor (β) to obtain a power spectrum for speech recognition (Zω(T)).

Various other features, exemplary features, and attendant advantages of the present disclosure will become more fully appreciated as the same becomes better understood when considered in conjunction with the accompanying drawings, in which like reference characters designate the same or similar parts throughout the several views.

BRIEF DESCRIPTION OF THE DRAWINGS

The figures form a part of the specification and are used to describe the embodiments of the invention and explain the principle of the invention together with the literal statement. The foregoing and other objects, aspects, and advantages will be better understood from the following non-limiting detailed description of preferred embodiments of the invention with reference to the drawings that include the following:

FIG. 6 is a diagram showing an example of a noise segment (a non-speech segment of the target speaker): (A) A schematic diagram showing a power spectrum Xω(T) before spectrum subtraction (SS); (B) A schematic diagram showing a subtracted power spectrum Yω(T) after the spectrum subtraction (SS); (C) A schematic diagram showing a power spectrum Dω(T) after gain control with a CSP coefficient; and (D) A schematic diagram showing a power spectrum for speech recognition Zω(T) after the Flooring process according to an embodiment of the current invention.

DETAILED DESCRIPTION OF THE PREFERRED EMBODIMENT

Figure 1:
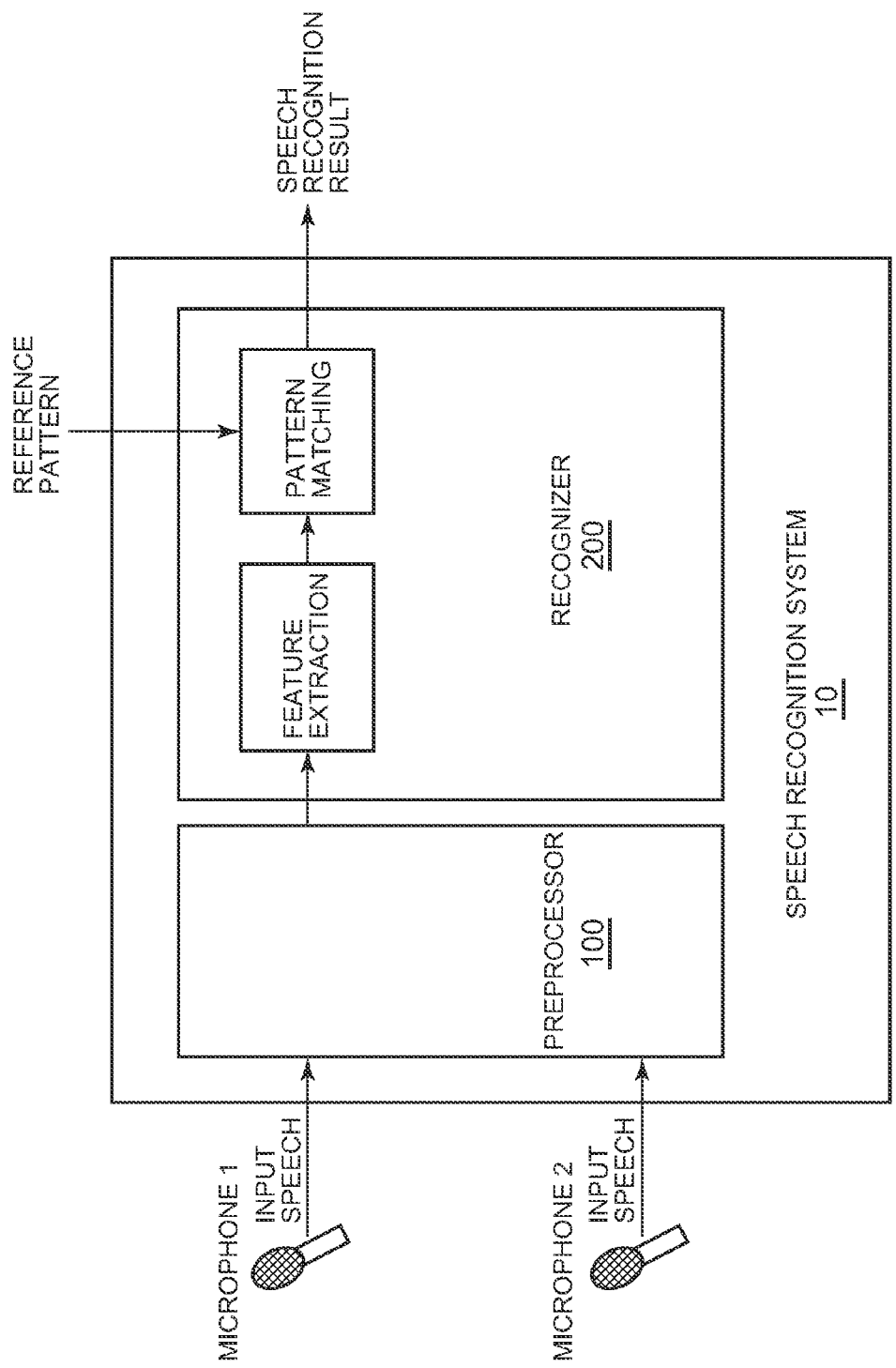
FIG. 1 is a block diagram of a speech recognition system according to an embodiment of the present invention.

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

Referring to FIG. 1, there is shown a block diagram of a speech recognition system to which an embodiment of the present invention is applied. The main structure of the speech recognition system 10 can be divided into a preprocessor 100 and a recognizer 200, which are connected as shown so as to perform a preprocessing function and a function of actually performing speech recognition, respectively. Input speeches coming from a microphone 1 and a microphone 2 are converted to frequency domains by a fast Fourier transform (FFT), the preprocessor 100 performs noise removal by SS and gain control with a CSP coefficient, and a result of the processing is input to the recognizer 200. The recognizer 200 then extracts a feature value for speech recognition and eventually outputs a result of speech recognition through pattern matching with a reference pattern. The present invention is applied to the preprocessor 100.

The effect of an embodiment of the present invention is evaluated according to the speech recognition result eventually obtained through the recognizer 200. An object of removing noise in a noisy environment or, from another viewpoint, however, an object of extracting a target speech can be achieved only by the preprocessor 100. Therefore, the preprocessor 100 can offer a feature of achieving these objects by itself and thus we can say that the preprocessor 100 constitutes the speech recognition system 10 in an inclusive sense and that it implements the speech recognition method.

Figure 2:
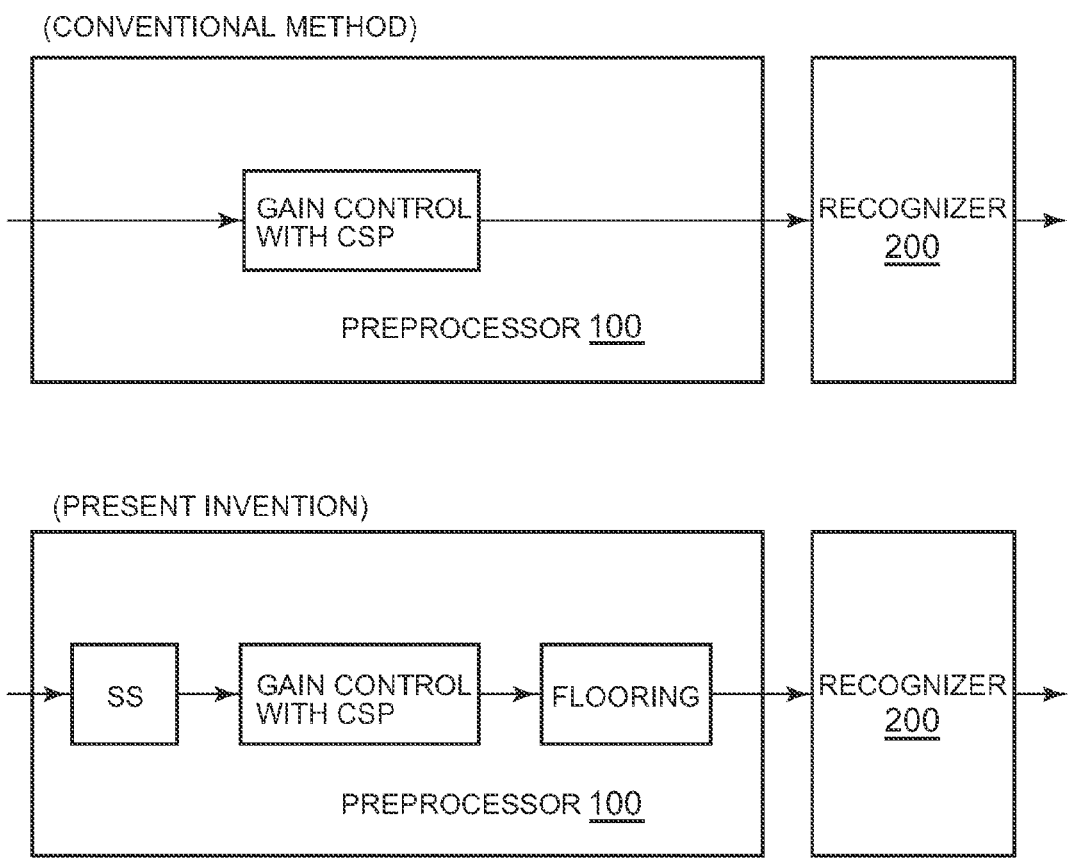
FIG. 2 is a processing flowchart for use in comparing procedures between a conventional method and an embodiment of the present invention.

Referring to FIG. 2, there is shown a processing flowchart for use in comparing procedures between a conventional method and an embodiment of the present invention. In the flow of the conventional method, a result of gain control (with a CSP coefficient) is directly input to the recognizer 200. On the other hand, according to an embodiment of present invention, the result of gain control is input to the recognizer 200 after performing a procedure in which the gain control (with the CSP coefficient) is performed after the spectrum subtraction (SS) process, which is a typical noise removal technique, and the Flooring process is performed at the end of the procedure.

An important point of an embodiment of present invention is the procedure, the SS process→the gain control (with the CSP coefficient)→the Flooring process, as shown in FIG. 2. The Flooring process is originally defined as a process for supplementing a spectrum excessively subtracted in the SS process and generally performed in the flow of a pair, the SS process→the Flooring process. According to an embodiment of the present invention, however, it is very important that the gain control (with the CSP coefficient) is performed between the SS process and the Flooring process. In the first place, there is no conventional technology where the relationship with any other noise removal technique is deeply studied.

Figure 3:
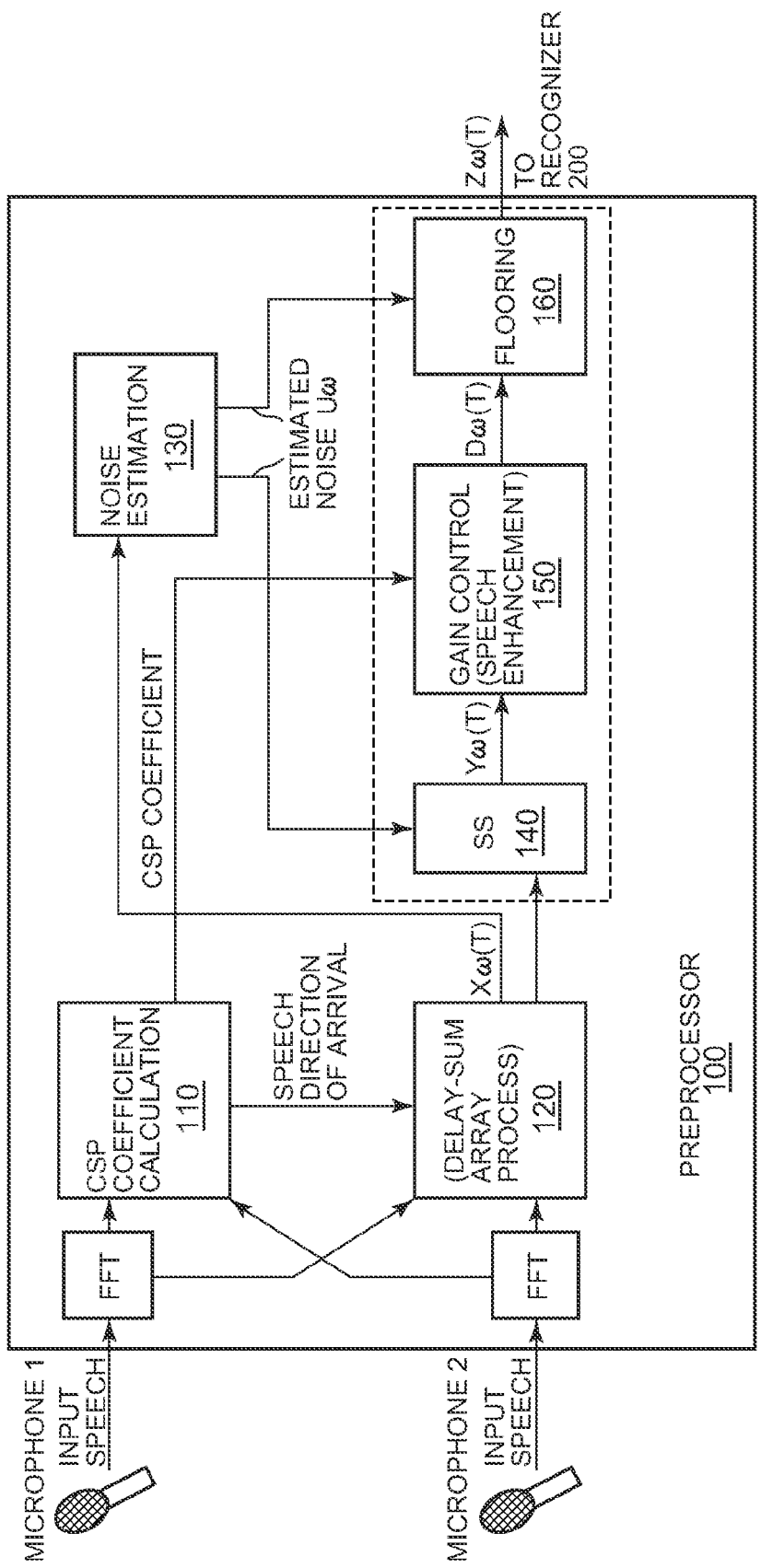
FIG. 3 is a processing flowchart of a detailed procedure according to an embodiment of the present invention.

Referring to FIG. 3, there is shown a processing flowchart of a detailed procedure according to an embodiment of the present invention. For example, a block representation, a CSP coefficient calculation 110 represents a unit of a processing block in the method of an embodiment of the present invention or a section which performs a function with the blocks connected to each other in the system of an embodiment of the present invention, or in the program of an embodiment of the present invention, it can be embodied as a unit of a code, instruction, or the like used when the method is executed in a system (a computer system or navigation system).

First, input speeches obtained as two-channel signals through the microphone 1 and the microphone 2, which are two speech input devices, are processed by a fast Fourier transform (FFT) individually and converted to frequency domains according to an embodiment of the present invention.

Subsequently, the processed input speeches can also be enhanced by a delay-sum array process 120 so as to form directivity in the direction of a target speaker according to an embodiment of the present invention.

The delay-sum array process 120 is to receive signals coming from a θ direction with at least two microphones and then to make the signals in phase and add them to each other so as to enhance the signals coming from the θ direction. Therefore, signals coming from directions other than the θ direction are not enhanced since they are not made in phase. Therefore, it is possible to form directivity that the sensitivity is high in the θ direction and is low in directions other than the θ direction according to an embodiment of the present invention.

Instead of the delay-sum array process 120, an adaptive array process can be applied to form a dead space in the direction of noise or reverberation. Moreover, it is quite acceptable to apply any other array process instead of the above. In addition, it is possible to omit these array processes, in other words, pass them straight so as to use one of the speech signals obtained by the two speech input devices as it is without any changes according to an embodiment of the present invention.

Subsequently, the control proceeds to a spectrum subtraction (SS) process 140 described by the following equation to further remove noise according to an embodiment of the present invention. [Eq. 1]:

$$Y\omega(T) = X\omega(T) - \alpha \cdot U\omega$$

In the equation 1, $X\omega(T)$ is a power spectrum before the SS process, $Y\omega(T)$ is a power spectrum after the SS process, namely a subtracted power spectrum, and $U\omega$ is a power spectrum of noise. $U\omega$ is estimated in a noise segment, namely a non-speech segment of a target speaker: it can be previously estimated so as to be fixedly used, can be sequentially estimated (updated) concurrently with receiving input speeches, or can be estimated (updated) at regular time intervals according to an embodiment of the present invention.

More specifically, a signal integrated from two input signals by the array process or one of the two input signals, $X\omega(T)$ is input to noise estimation 130, where a noise power spectrum $U\omega$ is estimated. $\alpha$ is an arbitrary subtraction constant and it can be an arbitrary value, though a value close to 1 (for example, 0.90 or the like) is often selected according to an embodiment of the present invention.

Thereafter, gain control (speech enhancement) 150 is performed using a CSP coefficient which is determined according to the equation below. The CSP coefficient can be calculated through the CSP coefficient calculation 110 in parallel with other processes. The gain control is also equivalent to a process of detecting a speech segment of the target speaker according to embodiment of the present invention.

$$\varphi(i, T) = IDFT \left[ \frac{DFT[s_1(t)]DFT[s_2(t)]^*}{|DFT[s_1(t)]DFT[s_2(t)]|} \right] \quad [\text{Eq. 2}]$$

In the equation 2, $\varphi(i, T)$ is a CSP coefficient calculated from the speeches input to the first and second speech input devices (microphones) and i is a direction of arrival (DOA) of the speech and is an angle index; t is a discrete time; and $s1(t)$ and $s2(t)$ are signals from the first and second speech input devices (microphones) that have been received at time t. In the CSP coefficient calculation, an accurate direction of arrival can be estimated independently of spectral characteristics of the signals by using phase information between the two-channel signals according to an embodiment of the present invention.

The gain control (speech enhancement) is as shown in the following equation. It is performed by multiplying the subtraction spectrum $Y\omega(T)$ after the SS process by the CSP coefficient according to an embodiment of the present invention.

$$D\omega(T) = Y\omega(T) \cdot \varphi(i, T) \quad [\text{Eq. 3}]$$

In the equation 3, $D\omega(T)$ is a power spectrum after the gain control. Since the CSP coefficient is low unless the target speaker is speaking, the power spectrum of a speech from a direction other than the direction of arrival is suppressed by this process. If the "gain control" can be performed as shown by this equation, it is understood that the technical idea of an embodiment of the present invention is not particularly limited to a technique using a CSP coefficient.

Figure 4:
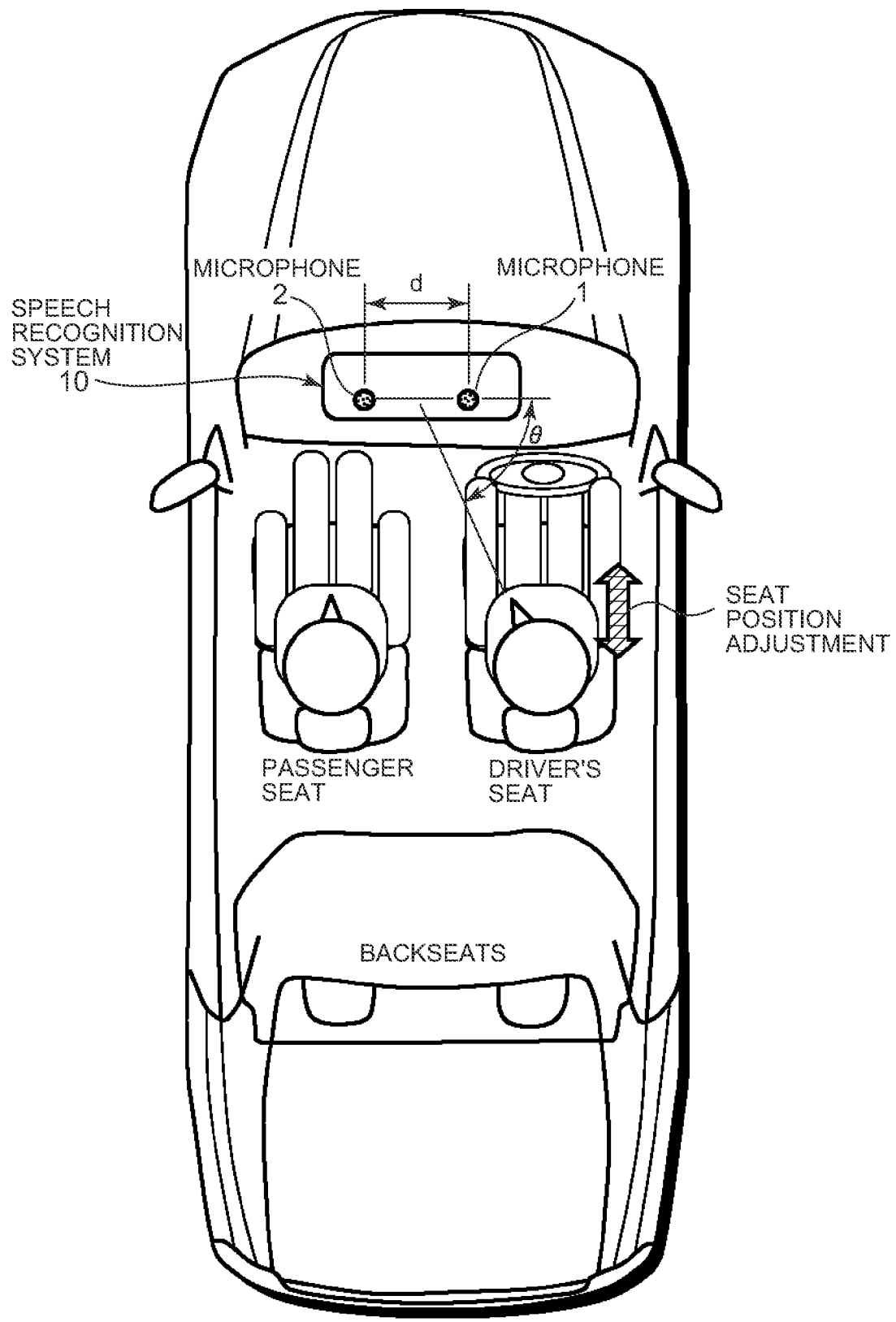
FIG. 4 is a top view showing a spatial positional relationship in the inside of a car according to an embodiment of the present invention

Referring to FIG. 4, there is shown a top view showing a spatial positional relationship in the inside of a car according to an embodiment of the present invention.

Regarding the speech direction of arrival (angle index) indicated by i, the positions of the driver and other seat members (the passenger seat and backseats) are almost determined in the inside space of the car and generally the driver gives a command or the like by speech from the driver's seat at a fixed position of the driver on the assumption that the driver is a target speaker. Therefore, the system performs the gain control with the CSP coefficient after fixing the direction of arrival of the target speaker's speech shown in equations 2 and 3. More specifically, the interior space design can be optimized by previously considering the speaker's position so as to aim at the direction of the target speaker's speech regarding the speech direction of arrival on the basis of the positional relationship between the target speaker and the speech input devices (microphones). Directivity can be formed in the direction of the target speaker without regard to the types of microphones (directional microphone or nondirectional microphone) according to an embodiment of the present invention.

In the spatial positional relationship, the speaker's position can also be estimated in real time according to the following equation 4 or equation 5.

$$\tau = \underset{k}{\mathrm{argmax}}(CSP(k)) \quad [\text{Eq. 4}]$$

$$\theta = \cos-1(c \cdot \tau / d \cdot Fs) \quad [\text{Eq. 5}]$$

In the equation 4 or equation 5, τ is a time lag in speech arrival between the first and second speech input devices (microphones), k is a discrete time, c is a sound velocity, d is a distance between the first speech input device (microphone) and the second speech input device (microphone), Fs is a sampling frequency, and θ is an angle between the speech direction of arrival and the microphone pair according to an embodiment of the present invention.

Specifically, in the spatial positional relationship between the microphones and the target speaker (more specifically, the target speaker's mouth, nose, vocal cords, or the like as a vocal organ of a human body), directivity can be fixedly formed in advance. What is needed is only to obtain two input speeches by the microphone pair of at least two speech input devices (1, 2) placed in different positions in the space and only the two-dimensionally formed directivity is enough from a practical viewpoint. Therefore, the explanation about the effect in the depth direction of the paper surface in FIG. 4 will be omitted here according to an embodiment of the present invention.

Those skilled in the art will be able to make adjustment afterwards appropriately in software to cope with a case, for example, where a relative positional relationship between the driver and the microphones in the car interior space is destroyed in relation to the seat position adjustment where the driver reclines the seat or puts it back up so as to suit the driver's build in order to achieve a flexible car usability according to an embodiment of the present invention.

According to an embodiment of the present invention, in the final step, a flooring process 160 is performed. The Flooring process means an operation based on the following equation, equation 6:

$$Z\omega(T) = D\omega(T) \quad \text{if} \quad D\omega(T) \geq \beta \cdot U\omega$$

$$Z\omega(T) = \beta \cdot U\omega \quad \text{if} \quad D\omega(T) < \beta \cdot U\omega$$

In the equation 6, $Z\omega(T)$ is a power spectrum for speech recognition after the Flooring process and $U\omega$ is a noise power spectrum: $U\omega$ can be the same as in the equation 1, though it can be estimated in any other methods and can be different from one in the equation 1. As shown in equation 6, $U\omega$ may be used in some cases only for conditional judgment as shown in FIG. 6. A Flooring factor $\beta$ is a constant having an arbitrary value and therefore it can be an arbitrary value, though a value close to zero (for example, 0.10) will be often selected.

An experiment regarding robustness against interfering speaker in passenger seat was performed to measure a word error rate of speech recognition of a speech command according to an embodiment of the present invention on the assumption of using a car navigation system in a car interior space. The experimental conditions are as shown in Table 1:

TABLE 1

| | |
|---|---|
| Sampling frequency | 22 kHz |
| Frame size | 23 ms |
| Frame shift | 15 ms |
| FFT size | 512 points |
| Feature vector | MFCC + First-order dynamic feature + Second-order dynamic feature + Power + First-order dynamic power + Second-order dynamic power (39 dimensions in total) |

Figure 5:
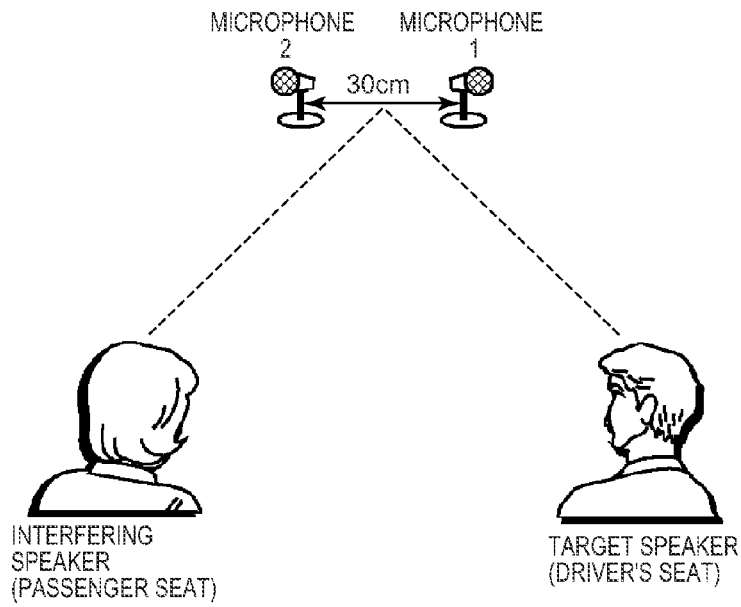
FIG. 5 is a schematic diagram showing a spatial positional relationship between a target speaker, an interfering speaker, and two speech input devices (microphones) and experimental conditions according to an embodiment of the present invention.

FIG. 5 is a schematic diagram showing a spatial positional relationship between a target speaker, an interfering speaker, and two speech input devices (microphones) and experimental conditions according to an embodiment of the present invention. The experimental conditions and a result of the recognition (word error rate) are shown in Table 2.

According to an embodiment of the present invention, Case 1 is a case where only the target speaker (driver) is speaking; Case 2 is a case where the interfering speaker (a seat member in the passenger seat) speaks as soon as the completion of the speech of the target speaker; and Case 3 is a case where the target speaker and the interfering speaker speak at the same time. The target speaker speaks continuous numbers (15408- - - ) and the interfering speaker does a daily conversation (for example, "It is hot today, isn't it?" or the like).

According to an embodiment of the present invention, Case 2 and Case 3 are cases where the speech end-point detection is difficult due to the effect of the speech of the interfering speaker: it is understood that the recognition performance is extremely deteriorated when using only a single microphone such as only the microphone on the side of the passenger seat or the microphone on the side of the driver's seat. As indicated by the result in Table 2, the present invention has a very large effect on improving the performance by using both of the microphone on the side of the passenger seat and the microphone on the driver's seat.

TABLE 2

| | | Word error rate | | |
|---|---|---|---|---|
| | | Only microphone on the side of passenger seat | Only microphone on the side of driver's seat | The present invention |
| Case 1 | Only the target speaker (driver) is speaking. | 0.90% | 0.60% | 0.60% |
| Case 2 | The interfering speaker (a seat member) speaks as soon as the completion of the speech of the target speaker. | 75.40% | 76.90% | 0.60% |
| Case 3 | The target speaker and the interfering speaker speak at the same time. | 83.10% | 85.10% | 2.90% |

According to an embodiment of the present invention example 2, is regarding robustness against DVD 5.1ch audio. An experiment was performed in which the car navigation system is caused to recognize speeches using 50 types of speech commands spoken by four speakers and collected for use in operating the car navigation system on the assumption of a situation in which DVD 5.1ch audio is output as background sound in the inside of a parked car (in an idling state with an air conditioner on). A result of the experiment (command recognition rate) is shown in Table 3. The item "Only SS" in the table shows a result of a command recognition rate obtained by performing a noise removal process using the conventional spectrum subtraction (SS) technique without performing the speech segment process and the gain control using two microphones. Also, in this experiment, it will be understood that the present invention has a high advantageous effect practically.

TABLE 3

| | Command recognition rate [%] |
|---|---|
| Only SS | 81.5 |
| The present invention (SS→Gain control with CSP→Flooring) | 98.5 |

According to an embodiment of the present invention example 3, is regarding comparison of procedures. This specification has described that it is important to perform the processing in the sequence of the SS process→the gain control with CSP→the Flooring process. An experiment was performed here to compare the difference in performance caused by the difference in processing sequence by changing the processing sequence to the SS process→the Flooring process→the gain control with CSP and to the gain control with CSP→the SS process→the Flooring process. A result of the experiment (command recognition rate) is shown in Table 4. As apparent from the table, enormously high performance is achieved when performing the processing in the sequence of the SS process→the gain control with CSP→the Flooring process, and therefore it is understood that the procedure in this sequence is important.

TABLE 4

|  | Command recognition rate [%] |
| --- | --- |
| Only SS | 81.5 |
| The present invention (SS→Gain control with CSP→Flooring) | 98.5 |
| Different procedure 1 (SS→Flooring→Gain control with CSP) | 84.0 |
| Different procedure 2 (Gain control with CSP→SS→Flooring) | 89.5 |

According to an embodiment of the present invention the reason for the enormously high performance of the procedure is assumed to be as described with reference to the schematic diagrams shown in (A), (B), (C), and (D) in FIG. 6. All of them show an example of a noise segment (a non-speech segment of the target speaker): (A) A schematic diagram showing a power spectrum $X\omega(T)$ before the spectrum subtraction (SS); and (B) a schematic diagram showing a subtracted power spectrum $Y\omega(T)$ after the spectrum subtraction (SS). The SS process reduces noise. (C) is a schematic diagram showing a power spectrum $D\omega(T)$ after the gain control with the CSP coefficient. The gain control with the CSP coefficient further reduces noise. (D) is a schematic diagram showing a power spectrum for speech recognition $Z\omega(T)$ after the Flooring process. Thereby, the rough noise spectrum is smoothed.

According to an embodiment of the present invention the CSP and flooring effects appear in the noise segment (the non-speech segment of the target speaker). The spectrum in the noise segment is smoothed by the SS process, peaks in spots are further collapsed by using the CSP coefficient, valleys are filled by the Flooring process, by which a smoothed (as if it were snowcapped) gentle spectral envelope is achieved. This results in preventing such a mistake that noise is recognized as a speech of the target speaker. Although the push-to-active method and the always-listening method have a problem that ambient noise is incorrectly recognized as a speech of the target speaker though the target speaker is not speaking, the error is reduced in principle by performing the processing in the sequence of the SS process→the gain control (with the CSP coefficient)→the Flooring process.

According to an embodiment of the present invention has been described on the assumption of application in a car navigation system, it can be practiced, as a method of the present invention or modular software which performs the method, by various types of processors such as other computer systems.

For example, an embodiment of the present invention can be organized as an object, procedure, or function, and it can include one or more physical or logical blocks of computer instructions. Executable modules do not always have to be physically located together, but can be distributed in some different storage locations if the functions of the respective modules can be implemented.

Moreover, according to an embodiment of the present invention there can also exist in the form of being supplied via a network or the like, and therefore, for example, an update version can be easily supplied as an application for the above. Needless to say, the modules can be implemented as hardware circuitry.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadcast interpretation so as to encompass all such modifications and equivalent structures and functions.

What is claimed is:

1. A method for extracting a target speech from two input speeches, wherein said input speeches are obtained using at least two speech input devices, said method comprising:
  determining a noise power spectrum, wherein said determination uses at least one of said two input speeches;
  applying a spectrum subtraction process to subtract at least part of said noise power spectrum from a speech spectrum of at least one of said two input speeches to obtain a subtracted power spectrum;
  computing cross-power spectrum phase (CSP) coefficients based on said two input speeches, said CSP coefficients indicative of a direction of a speaker relative to one of said at least two speech input devices;
  applying a gain control to said subtracted power spectrum based on said CSP coefficients, wherein said gain control amplifies speech received from a direction indicated by said CSP coefficients, to obtain a resultant power spectrum; and
  applying a flooring process to the resultant power spectrum to obtain a processed power spectrum of the target speech suitable for speech recognition.

2. The method of claim 1, further comprising:
  applying an array process on said two input speeches to enhance sound received from a direction indicated by said CSP coefficients, and applying said spectrum subtraction process to the result of said array process.

3. The method of claim 2, wherein said array process is a delay-sum array process using said two input speeches.

4. The method of claim 2, wherein said array process is an adaptive array process using said two input speeches.

5. The method of claim 1, wherein said at least two speech input devices are inside of a car.

6. The method of claim 1, wherein at least one of said at least two speech input devices includes a non-directional microphone.

7. The method of claim 1, wherein at least one of said at least two speech input devices includes a directional microphone.

8. The method of claim 1, wherein computing CSP coefficients comprises computing an angle indicative of a direction of said speaker relative to one of the at least two speech input devices.

9. The method of claim 1, further comprising:
  applying a recognizer to extract at least one feature value from the processed power spectrum for use in obtaining a speech recognition result.

10. The method of claim 1, wherein applying a flooring process to said resultant power spectrum comprises increasing at least one value of at least part of said resultant power spectrum.

11. A speech recognition system comprising:
a preprocessor for performing preprocessing to extract a target speech from two input speeches, wherein said input speeches are obtained using at least two speech input devices, said preprocessor comprising:
- a noise determination process section configured to determine a noise power spectrum, wherein said determination uses at least one of said two input speeches;
- a spectrum subtraction process section configured to apply a spectrum subtraction process to subtract at least part of said noise power spectrum from a speech spectrum of at least one of said two input speeches to obtain a subtracted power spectrum;
- a directivity computation section configured to compute cross-power spectrum phase (CSP) coefficients based on said two input speeches, said CSP coefficients indicative of a direction of a speaker relative to one of said at least two speech input devices; and
- a gain control section configured to apply gain control to said subtracted power spectrum based on said CSP coefficients, wherein said gain control amplifies speech received from a direction indicated by said CSP coefficients, to obtain a resultant power spectrum; and
- a flooring process section configured to apply a flooring process to the resultant power spectrum to obtain a processed power spectrum of the target speech suitable for speech recognition.

12. The system of claim 11, further comprising:
a recognizer configured to extract at least one feature value for use in obtaining a speech recognition result.

13. The system of claim 11, wherein the flooring process section is configured to increase at least one value of at least part of said resultant power spectrum.

14. At least one computer-readable storage device storing computer-executable instructions that, when executed by at least one processor, perform a method for extracting a target speech from two input speeches, wherein said input speeches are obtained using at least two speech input devices, said method comprising:
- determining a noise power spectrum, wherein said determination uses at least one of said two input speeches;
- applying a spectrum subtraction process to subtract at least part of said noise power spectrum from a speech spectrum of at least one of said two input speeches to obtain a subtracted power spectrum;
- computing cross-power spectrum phase (CSP) coefficients based on said two input speeches, said CSP coefficients indicative of a direction of a speaker relative to one of said at least two speech input devices;
- applying a gain control to said subtracted power spectrum based on said CSP coefficients, wherein said gain control amplifies speech received from a direction indicated by said CSP coefficients, to obtain a resultant power spectrum; and
- applying a flooring process to the resultant power spectrum to obtain a processed power spectrum of the target speech suitable for speech recognition.

15. The at least one computer-readable storage device of claim 14, further comprising:
applying a recognizer to extract at least one feature value for use in obtaining a speech recognition result.

16. The at least one computer-readable storage device of claim 14, wherein applying a flooring process to said resultant power spectrum comprises increasing at least one value of at least part of said resultant power spectrum.

* * * * *